United States Patent
Josyula et al.

(10) Patent No.: US 7,453,871 B2
(45) Date of Patent: Nov. 18, 2008

(54) EFFICIENT REDIRECTION OF LOGGING AND TRACING INFORMATION IN NETWORK NODE WITH DISTRIBUTED ARCHITECTURE

(75) Inventors: Ravi Josyula, San Jose, CA (US); Michael R. MacFaden, San Jose, CA (US)

(73) Assignee: Lucent Technologies Inc., Murray Hill, NJ (US)

( * ) Notice: Subject to any disclaimer, the term of this patent is extended or adjusted under 35 U.S.C. 154(b) by 1041 days.

(21) Appl. No.: 10/443,576

(22) Filed: May 22, 2003

(65) Prior Publication Data

US 2004/0028059 A1 Feb. 12, 2004

Related U.S. Application Data

(60) Provisional application No. 60/386,077, filed on Jun. 4, 2002.

(51) Int. Cl.
*H04Q 11/00* (2006.01)
(52) U.S. Cl. ........................... 370/386; 370/401
(58) Field of Classification Search ................ 370/355, 370/413, 329, 350, 509, 401, 398, 410, 402, 370/216, 229, 234, 241, 241.1, 386
See application file for complete search history.

(56) References Cited

U.S. PATENT DOCUMENTS

| | | | | |
|---|---|---|---|---|
| 4,969,083 A | * | 11/1990 | Gates | 700/18 |
| 6,148,337 A | * | 11/2000 | Estberg et al. | 709/224 |
| 6,195,351 B1 | * | 2/2001 | Hiscock et al. | 370/389 |
| 6,324,546 B1 | * | 11/2001 | Ka et al. | 707/203 |
| 6,553,416 B1 | * | 4/2003 | Chari et al. | 709/224 |
| 6,594,676 B1 | * | 7/2003 | Moore | 707/202 |
| 6,741,610 B1 | * | 5/2004 | Volftsun et al. | 370/466 |
| 2002/0080780 A1 | * | 6/2002 | McCormick et al. | 370/355 |
| 2002/0085571 A1 | * | 7/2002 | Meandzija | 370/410 |
| 2002/0089977 A1 | * | 7/2002 | Chang et al. | 370/386 |
| 2002/0164952 A1 | * | 11/2002 | Singhal et al. | 455/41 |
| 2003/0081556 A1 | * | 5/2003 | Woodall | 370/241 |
| 2005/0128978 A1 | * | 6/2005 | Pecen et al. | 370/329 |
| 2005/0281202 A1 | * | 12/2005 | Rocheleau et al. | 370/241 |

OTHER PUBLICATIONS

Cabletron Distributed Routing Software Event Logging System Messages Guide, Apr. 1999.
Mod_Log_Spread, a tool for distributed auditing and monitoring, May 27, 2000.
Linux System Administration SYSKLOGD (8), Dec. 13, 1995.

* cited by examiner

*Primary Examiner*—Brian D Nguyen

(57) ABSTRACT

A method for distributing logging and tracing information in a network node is disclosed. In one embodiment, log messages generated locally on the line cards are collected by Secondary Log Managers residing on the line cards. The Secondary Log Managers process the collected messages and transfers at least part of them to a Primary Log Manager residing at the control module. Then, the Primary Log Manager can output the logging and tracing messages to a system monitor or to other output devices, such as a Command Line Interface (CLI) shell or a file.

22 Claims, 5 Drawing Sheets

EFFICIENT REDIRECTION OF LOGGING AND TRACING INFORMATION IN NETWORK NODE WITH DISTRIBUTED ARCHITECTURE

CROSS-REFERENCE TO RELATED APPLICATIONS

This application is entitled to the benefit of provisional Patent Application Ser. No. 60/386,077, filed 4 Jun. 2002, and is related to co-pending non-provisional Patent Application entitled "SHELL SPECIFIC FILTERING AND DISPLAY OF LOG MESSAGES," filed May 22, 2003 and having Ser. No. 10/443,577. The aforementioned patent applications are hereby incorporated by reference for all purposes.

FIELD OF THE INVENTION

The invention relates generally to a system and method for handling logging and tracing messages generated by a network node with a distributed architecture.

BACKGROUND OF THE INVENTION

A typical router is a chassis-based system that includes a control module, which performs higher level management functions, and line cards, which provide the interface between the router and other network devices (i.e., servers, workstations, switches, other routers, etc.).

First generation switch/routers typically use a centralized architecture. In those switch/routers, forwarding decisions for traffic received on all of the line cards are made by a single central forwarding engine that resides in the control module. Some newer generation switch/routers use a distributed architecture. In such newer generation switch/routers, forwarding engines that exist at each line card can make forwarding decisions for traffic received on the line cards.

In the newer generation switch/routers, logging and tracing messages generated on each line cards are stored locally on the line cards. In order to view the logging and tracing messages, the user of the switch/router or network administrator has to access each line cards individually. Accessing each individual line card to retrieve information is tedious and time-consuming.

Accordingly, there exists a need for a method and system that allows a user of a switch/router to view log messages generated by each line card in a convenient manner.

SUMMARY OF THE INVENTION

One embodiment of the invention is a method for distributing log messages (e.g., logging and tracing information) within a network node that has a distributed processing architecture. The network node includes a control module and multiple line cards each having its own processor. Furthermore, the line cards each run instances of an operating system and application programs independently of the others. In one embodiment, log messages generated locally on the line cards (by the operating system kernel or application programs) are collected by Secondary Log Managers residing on the line cards. The Secondary Log Managers process the collected log messages and transfer at least part of the log messages to a Primary Log Manager residing at the control module. Then, the Primary Log Manager can output the log messages to a SYSLOG server or to other output devices, such as a Command Line Interface (CLI) shell.

According to the invention, the Secondary Log Managers suppress duplicate transmission of log messages. In one embodiment, when a Secondary Log Manager collects a predetermined number of the same log messages within a period time, it will not save or forward the same log messages that are subsequently collected. Further, in one embodiment, the Secondary Log Managers can keep track of the number of suppressed log messages at each line card, and can send the number to the Primary Log Manager.

In one embodiment, each Secondary Log Manager establishes a TCP connection with the Primary Log Manager on which log messages and other information are transmitted.

Another embodiment of the invention is a network node that can efficiently gather log messages generated by different subsystems and redirect them to one centralized location. The network node can then efficiently output the log messages from the centralized location to one or more CLI shells. The network node can also output the log messages to one or more files.

Other aspects and advantages of the invention will become apparent from the following detailed description, taken in conjunction with the accompanying drawings, illustrating by way of example the principles of the invention.

BRIEF DESCRIPTION OF THE DRAWINGS

Throughout the description, similar reference numbers may be used to identify similar elements.

DETAILED DESCRIPTION OF THE INVENTION

Figure 1:
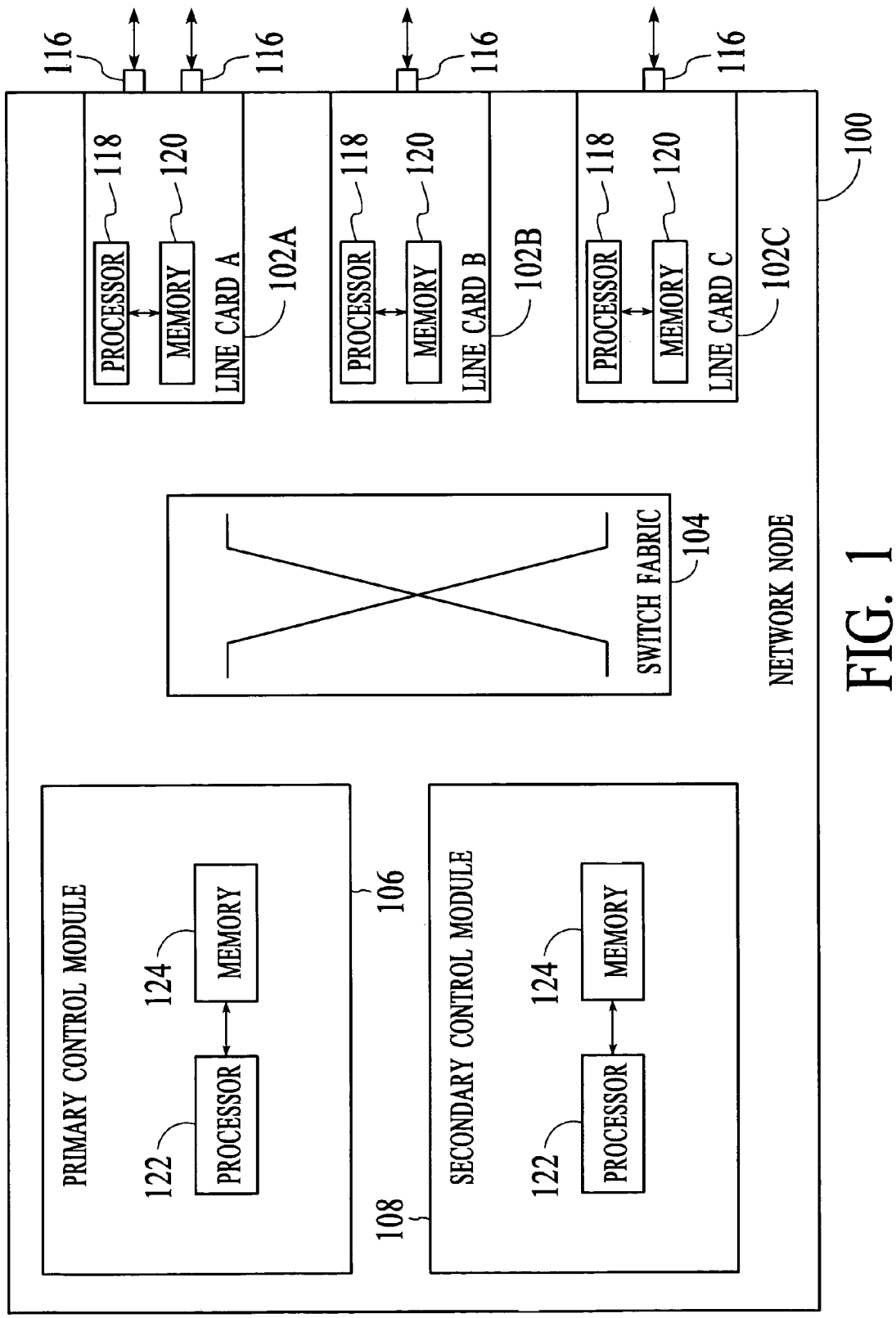
FIG. 1 depicts a network node on which an embodiment of the invention can be implemented.

FIG. 1 depicts a network node 100 on which an embodiment of the invention can be implemented. The example network node 100 has a distributed processing architecture. It includes a primary control module 106, a secondary control module 108, a switch fabric 104, and three line cards 102A, 102B, and 102C (line cards A, B, and C). The network node handles traffic in discrete units, often referred to as datagrams. In an embodiment, the network node is an Ethernet switch/router that forwards traffic within the network node using Layer 2, Layer 3, and/or Layer 4 header information. The network node may include line cards that support network protocols such as Ethernet, ATM, and Frame Relay. Although an Ethernet-based switch/router is described, the invention can be applied to any network node that has a distributed processing architecture.

The primary and secondary control modules 106 and 108 support various functions, such as network management functions and protocol implementation functions. Example functions that are performed by the control modules include implementing configuration commands, providing timing control, updating log messages, programming hardware tables, providing system information, supporting user interfaces, managing hardware changes, bus management, and protocol processing. Example protocols that are implemented by the control modules include Layer 2 (L2) protocols, such as L2 Learning, spanning tree protocol (STP), and link aggregation control protocol (LACP) and Layer 3 (L3) protocols such as address resolution protocol (ARP), open shortest path first (OSPF) protocol, border gateway protocol (BGP), and intermediate-system to intermediate-system (ISIS) protocol. The layers are defined by the International Organization for Standardization (ISO) in the open system interconnect (OSI) model.

In the embodiment of FIG. 1, each of the control modules 106 and 108 includes a processor 122 and memory 124 for carrying out the designated functions. The processor within each control module may include a multifunction microprocessor (such as the Intel i386 processor) and/or an application specific processor that is operationally connected to the memory. The memory may include electrically erasable programmable read-only memory (EEPROM) or flash ROM for storing operational code and dynamic random access memory (DRAM) for buffering traffic and storing data structures, such as log messages. Although the processor and memory are depicted as separate functional units in FIG. 1, in some instances, the processor and memory are integrated onto the same device. In addition, there may be more than one discrete processor unit and more than one memory unit on the control modules.

The switch fabric 104 provides datapaths between input ports and output ports of the network node 100 and may include, for example, shared memory, shared bus, and crosspoint matrices. Although not depicted, the network node may be equipped with redundant switch fabrics.

Each of the line cards 102A, 102B, and 102C includes at least one port 116, a processor 118, and memory 120. The line cards perform functions such as receiving traffic into the network node, buffering traffic, storing log messages of an FIB, protocol processing, making forwarding decisions, and transmitting traffic from the network node. The processor within each line card may include a multifunction processor and/or an application specific processor that is operationally connected to the memory. The processor performs functions such as protocol processing, packet parsing, packet classification, and making forwarding decisions. The memory within each line card includes circuits for storing operational code, for buffering traffic, for storing log messages, and for storing other data structures. Operational code is typically stored in non-volatile memory such as EEPROM or flash ROM while traffic and data structures are typically stored in volatile memory such as random access memory (RAM). Example data structures that are stored in the RAM include configuration state information and traffic log messages. Log messages may also be stored in a file system, which may include a memory system (e.g., memory chips, or a disk drive). Although the processor and memory are depicted as separate functional units, in some instances, the processor and memory are integrated onto the same device. In addition, there may be more than one discrete processor unit and more than one memory unit on the line cards.

In the embodiment of FIG. 1, the processors on each line card and on the control modules run separate instances of an operating system. Examples of the operating system that is run on each line card include NetBSD, FreeBSD, Solaris, Linux, and Unix. Although some operating systems are identified as examples, other operating systems may be used. In an embodiment, a slim base and open source operating system is used. In an embodiment, the operation system that is used by the control modules is different from the operating system that is used by the line cards. For example, the operating systems for the control modules and line cards may be the same basic operating systems (e.g., NetBSD) that are customized to the particular hardware supported at the control modules and the line cards.

In an embodiment, log messages may be generated by the control modules and the line cards. Throughout the description, log messages refer to logging messages and tracing messages generated by the operating system kernel or application programs running on one or more of the line cards or the control modules. Logging messages are typically event-triggered. Tracing messages are typically generated by application software when certain software procedures are executed. Both logging and tracing messages are sometimes used by developers and network administrators when debugging the network node.

Figure 2:
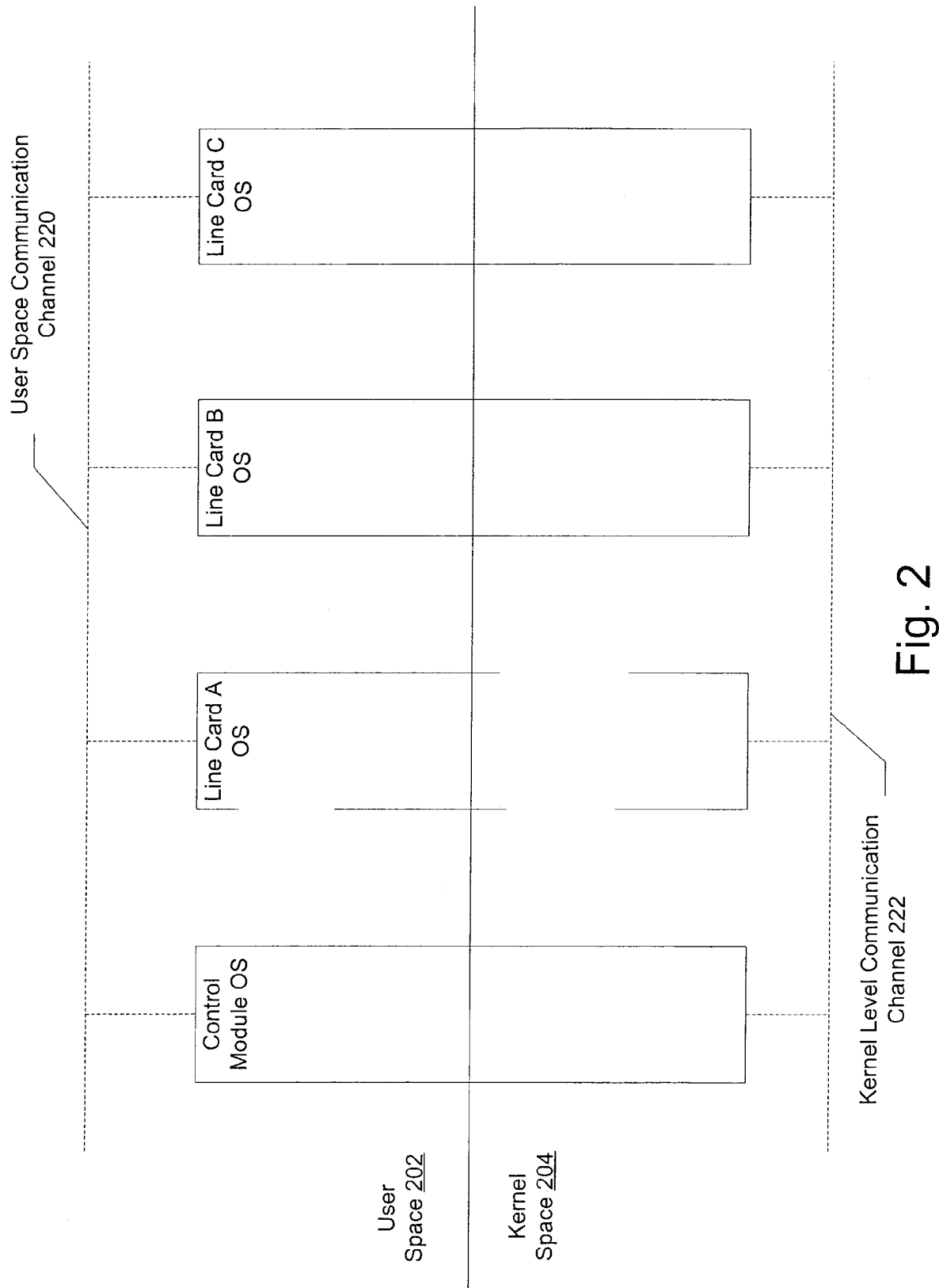
FIG. 2 is a functional depiction of multiple instances of the operating systems that are running in the network node of FIG. 1.

FIG. 2 is a functional depiction of multiple instances of the operating systems that run in the switch/router of FIG. 1. Specifically, operating systems are depicted for the primary control module and the three line cards. In the functional depiction of FIG. 2, the operating system space is logically divided into a "kernel space" 204 and a "user space" 202. Description of an operating system in terms of a kernel space and a user space is well known in the field of computer science. The kernel space of an operating system is the part of the operating system that manages hardware resources, provides fundamental functionality, and provides fundamental programming interfaces to application programs that operate in the user space. Example network node operations performed in the kernel space include rate control (i.e., rate limiting and rate shaping), maintaining statistics, and managing hardware tables that include L2 tables, L3 tables, access control lists (ACLs), quality of service (QoS) tables, and exit port tables.

The user space of the operating system, also referred to as the "userland," is the part of an operating system that includes the application programs that are supported by the kernel. The application programs perform specific tasks such as network management, configuration management, and L2 and L3 protocol processing. Multiple application programs may be running simultaneously in the user space. All of the application programs are supported by, and rely on, the processing resources of the kernel to execute the application calls.

FIG. 2 also depicts two different communications channels that are used to communicate information between the different instances of the operating systems. One of the communications channels communicates at the user space level and is referred to herein as the "user space communications channel." The other communications channel communicates at the kernel level and is referred to herein as the "kernel space communications channel." The user space communications channel is logically depicted by the dashed line 220 that connects the operating systems in the user space 202. The kernel space communications channel is logically depicted by the dashed line 222 that connects the operating systems in the kernel space 204.

The user space communications channel involves communications at the application level. At the application level, software application programs that exist in the user space of different instances of the operating systems communicate with each other. In an embodiment, application programs communicate using a transport layer protocol such as TCP (Transport Control Protocol). TCP communication channels are accomplished between the instances of the operating systems using well-known port/socket numbers.

The kernel space communications channel involves communications at the kernel level. For example, the kernels of different instances of the operating system communicate directly with each other without passing messages through the user space. In an embodiment, the operating systems communicate with each other at the kernel level through a data link layer protocol. In the embodiment of FIG. 2, the operating systems communicate with each other at the kernel level using standard Ethernet protocol.

Figure 3:
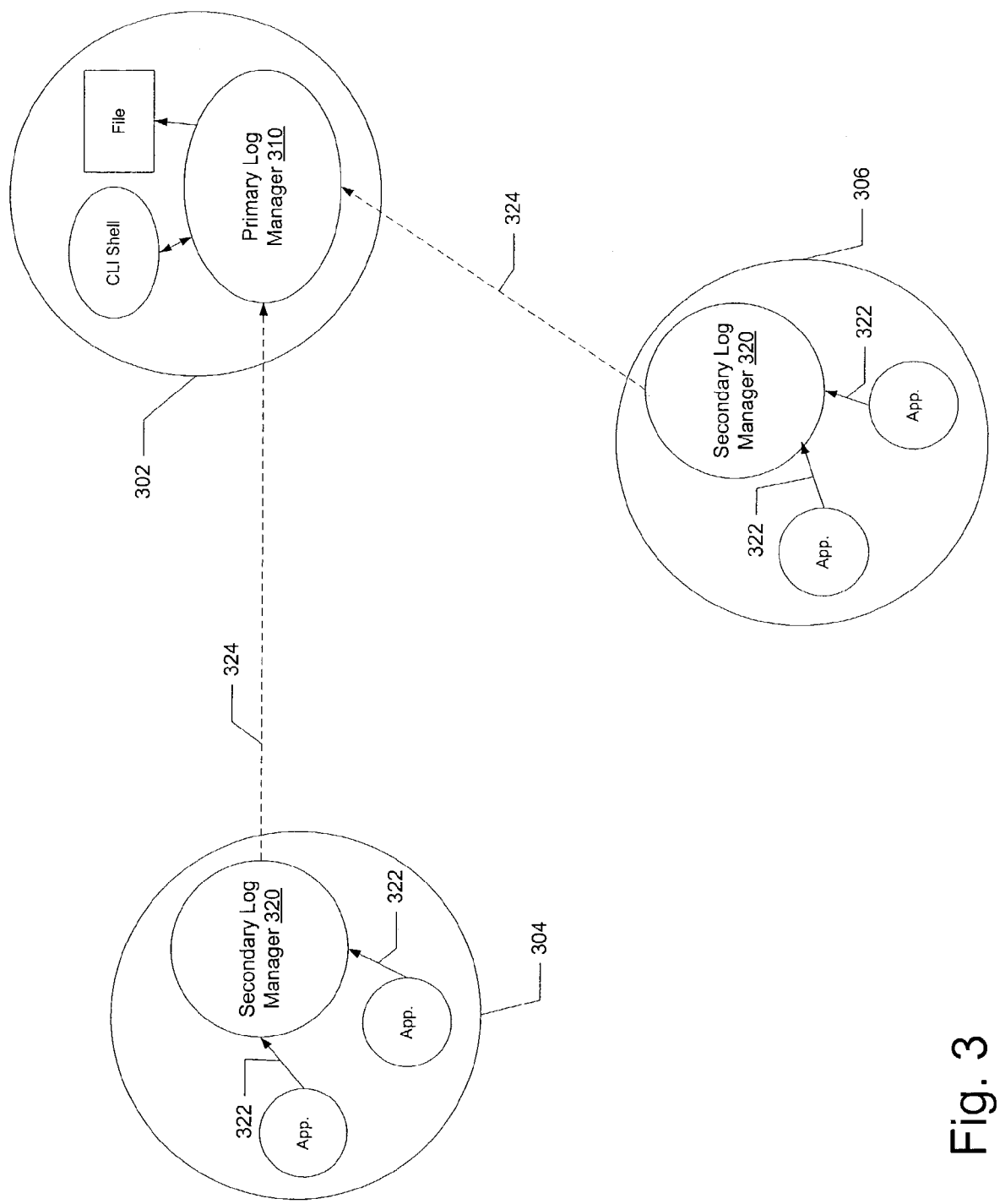
FIG. 3 illustrates software processes of the network node of FIG. 1, in accordance with an embodiment of the invention.

Attention now turns to FIG. 3, which illustrates software processes of the network node 100 according to an embodiment of the invention. Two instances of an operating system running on two line cards of the network node 100 are represented by circles 304 and 306. Circle 302 represents an instance of an operating system running on a control module of the network node 100. As shown, multiple application programs (including a Secondary Log Manager 320) run on each line card. Further, multiple application programs including a Primary Log Manager 310 and a Command Line Interface (CLI) shell run on the control module. In the invention, Secondary Log Managers are also called "log gatherers" and Primary Log Managers are also called "log dispatchers."

The application programs may generate log messages so as to allow developers and network administrators to determine the status of the network node and its operational flow. According to the invention, log messages generated on each line card are collected by the Secondary Log Managers 320. After collecting the messages, the Secondary Log Managers 320 transfer the collected log messages to the Primary Log Manager 310 at the control module. The Primary Log Manager 310 then distributes the log messages to appropriate output devices or to appropriate storage devices for archiving. In one embodiment, the Secondary Log Managers 320 also accept log strings, error messages, SYSLOG messages and kernel logs.

In one embodiment, the application programs running on one processor register with the Secondary Log Manager 320 running on the same processor as they open UNIX-domain socket connections for sending log messages. In one embodiment, as the application programs open UNIX-domain socket connections, the kernel will save a log message to a device called /dev/klog, which is accessible by the Secondary Log Managers 320 to determine where the messages are originated. The UNIX-domain socket connections are represented by arrows 322 in FIG. 3.

In one embodiment, an n_log procedure call, which is analogous to the standard printf procedure call of UNIX, is implemented as part of the application programs. Whenever an application program uses the procedure call n_log to output a message, the text of that message is "printed" on a socket connection designated by n_log. The Secondary Log Managers 320 listen on the local UNIX-domain sockets for connections from application programs and receive log messages outputs from the application programs.

After receiving the log messages, the Secondary Log Managers 320 forward the log messages to the Primary Log Manager 310 via connection 324. In one embodiment, the connection 324 is a user space communications channel, such as one shown in FIG. 2. More specifically, in one embodiment, the connection 324 is a standard TCP (Transport Control Protocol) connection on a predetermined port to ensure that the log messages are transmitted to the Primary Log Manager 310 in a reliable manner.

The Secondary Log Managers 320 may not necessarily forward all of the collected log messages to the Primary Log Manager 320. Rather, the Secondary Log Managers 320 may perform a duplicate suppression process to filter out redundant log messages. In one embodiment, if a message appears more than three times in five minutes, the same message received subsequently will not be forwarded to the Primary Log Manager 310.

After receiving the log messages, the Primary Log Manager 310 stores them in a Log Depository and then outputs them to one or more Command Line Interface (CLI) shells according to user configuration. The Primary Log Manager 310 can also output the log messages to a file or archive according to user configuration. The Primary Log Manager 310 may also provide the log messages to an external SYSLOG server (not shown).

Figure 4:
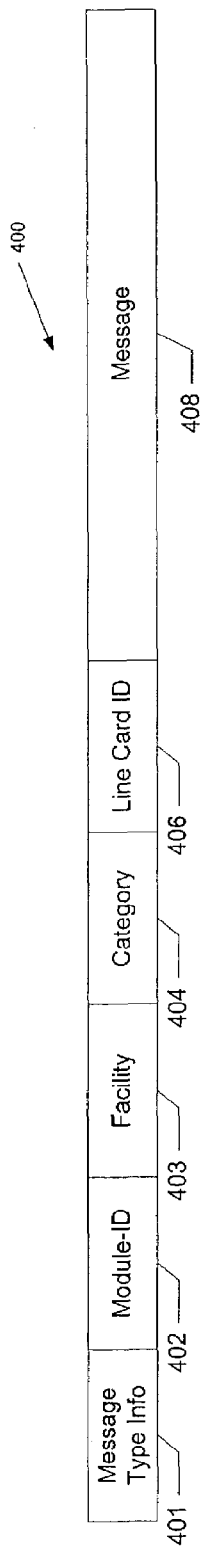
FIG. 4 illustrates a format of a log message according to an embodiment of the invention is shown.

According to the invention, the Secondary Log Managers send meta data to the Primary Log Manager in conjunction with the log messages. FIG. 4 illustrates a format of a log message 400 according to an embodiment of the invention. As shown, the log message 400 includes a Message section 408 and meta data sections such as Message Type 401, Module-ID 402, Facility 403, Category 404, and Line Card ID 406. In one embodiment, the Message section 408 contains textual information that is output by an application program using the procedure call n_log. The Message Type section 401 allows the Primary Log Manager to determine the type (e.g., trace log, sys log, error log, kernel log) of the log message 400. The Module-ID section 402 allows the Primary Log Manager to determine from which software module the log message 400 originates. The Facility section 403 and the Line Card ID section 406 contains information that indicates the physical origin of the log message 400. The Facility section 402 may include information that identifies the central office in which the network node is located, since an application can be running on multiple facilities. The Line Card ID section may include information that identifies the specific line card of a network node that generated the message. The Category section 404 may include information that indicates the category of the facility from which the log message 400 originates. In one embodiment, the Message Type, Module-ID, Facility, Category and Message sections are generated by the application program. The Line Card ID section is appended to the log message by a Secondary Log Manager.

Figure 5:
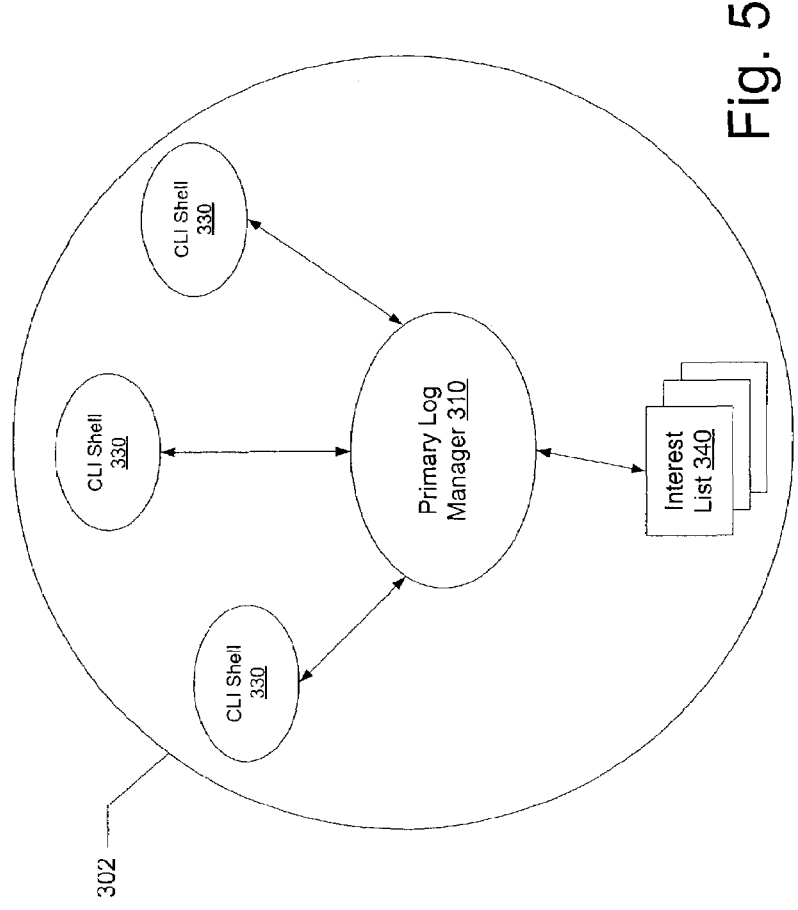
FIG. 5 illustrates software processes of the control module of the network node in accordance with an embodiment of the invention.

The use of a log message format that includes meta-data of a log message enables the Primary Log Manager 310 to differentiate the log messages and to selectively output log messages to different devices. FIG. 5 illustrates software processes of the control module of the network node 100 in accordance with an embodiment of the invention. Circle 302 represents an instance of an operating system running on a control module of the network node 100. As shown, software processes running on the control module include a Primary Log Manager 310 and several Command Line Interface (CLI) shells 330. As is well known in the art, a CLI shell is an application program that provides an interface to a user or a network administrator. A user can manipulate the network node through the CLI shell. As is well known in the art, a CLI shell can be accessible remotely from a computer system or network device coupled to the network node via a network. Multiple instances of a CLI shell program can be run by the control module at the same time.

In this embodiment, the CLI shells 330 register with the Primary Log Manager 310 and inform it of the log messages they are interested in receiving. For example, a CLI shell 330 can indicate to the Primary Log Manager 310 that it is only interested in receiving log messages that contain certain information in the Facility section and Category section. The Primary Log Manager 310 then builds an Interest List 340 for each CLI shell based on information received.

Upon receiving log messages from the Secondary Log Managers 320, the Primary Log Manager 310 goes through the Interest Lists of the different CLI shells and outputs log messages accordingly. In other words, the Primary Log Manager 310 selectively filters log messages based on interest conveyed by the CLI shells 330. Thus, in this embodiment, all the shells do not necessarily see all of the log messages collected by the Primary Log Manager 310. Users can also open different shells to display different types of log messages and or log messages from different line cards or facilities.

Figure 6:
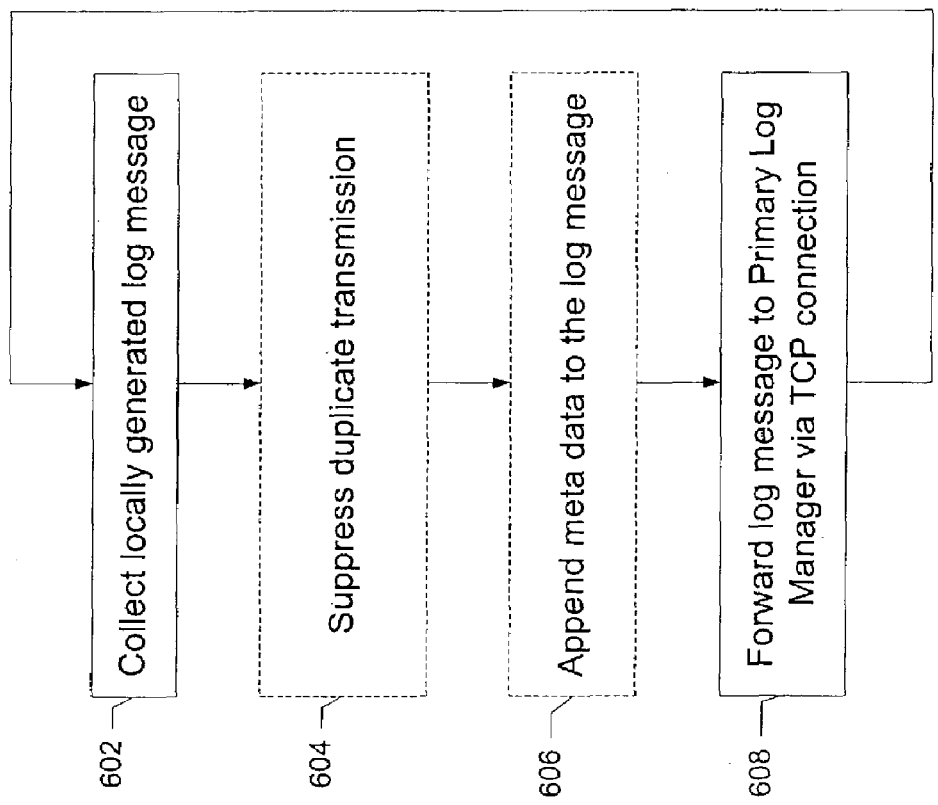
FIG. 6 depicts a process flow diagram of a method for distributing log messages in accordance with an embodiment of the invention.

FIG. 6 depicts a process flow diagram of a method for distributing log messages in accordance with an embodiment of the invention. At step 602, the Secondary Log Manager collects a locally generated log message. That is, the Secondary Log Manager residing on a line card receives a log message generated on that same line card. At step 604, the Secondary Log Manager suppresses duplicate transmission of identical log messages. In one embodiment, the Secondary Log Manager performs duplicate suppression by dropping the log message if that same message has appeared previously for a predetermined number of times in the past predetermined period of time. At step 606, the Secondary Log Manager appends meta data (e.g., Facility information, Category information, Line Card ID information) to the log messages. At step 608, the Secondary Log Manager forwards log messages to the Primary Log Manager via a TCP connection. Thereafter, steps 602-608 are repeated for another log message. It should be noted that, in other embodiments, steps 604 and 606 are optional.

Figure 7:
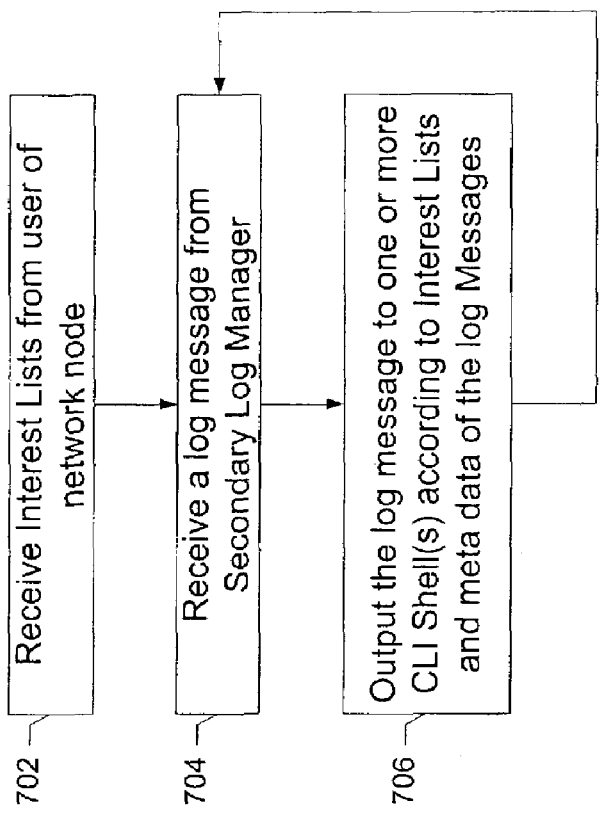
FIG. 7 depicts a process flow diagram of a method for filtering and displaying log messages in accordance with an embodiment of the invention.

FIG. 7 depicts a process flow diagram of a method for filtering and displaying log messages in accordance with an embodiment of the invention. At step 702, the Primary Log Manager receives Interest Lists from one or more users of the network node. As described above with respect to other embodiments, an Interest List is associated with a CLI shell and describes attributes of the log messages the user desires to be outputted to that CLI shell. At step 704, the Primary Log Manager receives a log message from the Secondary Log Managers. At step 706, the Primary Log Manager outputs the log message to one or more CLI shells according to the information in the Interest Lists and meta data of the log message. Thereafter, steps 704-706 are repeated for another log message.

Preferred embodiments of the invention have thus been described. Elements of the invention may be embodied in hardware and/or software as a computer program code (including firmware, resident software, microcode, etc.). Furthermore, the invention may take the form of a computer program product on a computer-usable or computer-readable storage medium having computer-usable or computer-readable program code embodied in the medium for use by or in connection with a network node such as that shown in FIG. 1. A computer-usable or computer-readable medium may be any medium that can contain, store, communicate, or transport the program for use by or in connection with an instruction execution system. The computer-usable or computer-readable medium can be, for example, an electronic, magnetic, optical, electromagnetic, infrared, or semiconductor system. The medium may also be simply a stream of information being retrieved when the computer program product is "downloaded" through a network such as the Internet. Note that the computer-usable or computer-readable medium could even be paper or another suitable medium upon which a program is printed.

Finally, although specific embodiments of the invention have been described and illustrated, the invention is not to be limited to the specific forms or arrangements of parts as described and illustrated herein. For instance, it should also be understood that throughout this disclosure, where a software process or method is shown or described, the steps of the method may be performed in any order or simultaneously, unless it is clear from the context that one step depends on another being performed first.

What is claimed is:

1. A method of distributing logging and tracing information in a network node that has a distributed processing architecture, the method comprising:
    collecting log messages generated at each one of a plurality of line cards of the network node;
    at each one of the plurality of line cards of the network node, forwarding at least part of the collected log messages to a control module of the network node; and
    suppressing duplicate transmission of the collected log messages at each of the line cards;
    wherein the suppressing step comprises, at one or more of the line cards, dropping a log message if identical log messages have been sent by the one or more line cards to the control module within a predetermined period of time.

2. The method of claim 1, wherein the forwarding step comprises forwarding at least part of the collected log messages via a TCP connection between one of the line cards and the control module.

3. The method of claim 1, wherein the collecting step comprises collecting log messages generated by local user processes at each one of the plurality of line cards.

4. The method of claim 1, wherein the collecting step comprises collecting log messages generated by an operating system kernel of each one of the plurality of line cards.

5. The method of claim 1 further comprising keeping track of the number of suppressed log messages and sending the number of suppressed log messages to the control module.

6. A network node that has a distributed processing architecture, comprising:
    a control module; and
    a plurality of line cards each having:
        means for collecting locally generated log messages;
        means for forwarding at least part of the collected log messages to the control module; and
        means for suppressing duplicate transmission of the collected log messages at each of the line cards;
        wherein the means for suppressing comprises means for dropping a log message if identical log messages have been sent by one or more line cards to the control module within a predetermined period of time.

7. The network node of claim 6, wherein the means for forwarding comprises means for forwarding at least part of the collected log messages via a TCP connection between one of the line cards and the control module.

8. The network node of claim 6, wherein the means for collecting comprises means for collecting log messages generated by local user processes at each one of the plurality of line cards.

9. The network node of claim 8, wherein the means for collecting comprises means for collecting log messages generated by an operating system kernel of each one of the plurality of line cards.

10. The network node of claim 6 wherein the plurality of line cards further comprise means for keeping track of the number of suppressed log messages and sending the number of suppressed log messages to the control module.

11. A computer program product for use in conjunction with a network node that has a distributed processing architecture, the computer program product comprising a computer readable medium stored thereon computer program codes which, when executed by a computer device, cause the computer device to distribute logging and tracing information within the network node, the computer program product comprising:

computer program codes to cause each one of a plurality of line cards of the network node to collect locally generated log messages;

computer program codes to cause each one of the plurality of line cards of the network node to forward at least part of the collected log messages to a control module of the network node;

computer program codes to cause the network node to suppress duplicate transmission of the collected log messages; and computer program codes to cause the network node to drop a log message if identical log messages have been sent by one or more line cards to the control module within a predetermined period of time.

12. The computer program product of claim 11, comprising computer program codes to cause the network node to forward at least part of the collected log messages via a TCP connection between a corresponding line card and the control module.

13. The computer program product of claim 11, comprising computer program codes to cause the network node to collect log messages generated by local user processes at each one of the plurality of line cards.

14. The computer program product of claim 13, comprising computer program codes to cause the network node to collect log messages generated by an operating system kernel of each one of the plurality of line cards.

15. The computer program product of claim 11 further computer program codes to cause each one of the plurality of line cards of the network node to keep track of the number of suppressed log messages and send the number of suppressed log messages to the control module.

16. A network node, comprising:

a switch matrix;

at least one control module operatively coupled to the switch matrix, the control module having a primary log manager; and a plurality of line cards operatively coupled to the at least one control module via the switch matrix, the plurality of line cards each having a secondary log manager, wherein the secondary log managers are operable to collect log messages generated at the plurality of line cards and to forward at least part of the collected log messages to the primary log manager, wherein the secondary log managers suppress duplicate transmission of the collected log messages;

wherein the secondary log managers drop a log message if identical log messages have been sent by the line cards to the control module within a predetermined period of time.

17. The network node of claim 16, wherein the secondary log managers forward at least part of the collected log messages via TCP connections between the line cards and the control module.

18. The network node of claim 16, wherein the secondary log managers collect log messages generated by local user processes at each one of the plurality of line cards.

19. The network node of claim 18, wherein the secondary log managers collect log messages generated by an operating system kernel of each one of the plurality of line cards.

20. The network node of claim 16 wherein the secondary log managers keep track of the number of suppressed log messages and send the number of suppressed log messages to the primary log manager.

21. A method of distributing logging and tracing information in a network node that has a distributed processing architecture, the method comprising:

collecting log messages generated at each one of a plurality of line cards of the network node;

at each one of the plurality of line cards of the network node, forwarding at least part of the collected log messages to a control module of the network node;

suppressing duplicate transmission of the collected log messages at each of the line cards; and keeping track of the number of suppressed log messages and sending the number of suppressed log messages to the control module.

22. A network node, comprising:

a switch matrix;

at least one control module operatively coupled to the switch matrix, the control module having a primary log manager; and a plurality of line cards operatively coupled to the at least one control module via the switch matrix, the line cards each having a secondary log manager, wherein the secondary log managers are operable to collect log messages generated at the plurality of line cards and to forward at least part of the collected log messages to the primary log manager, wherein the secondary log managers suppress duplicate transmission of the collected log messages;

wherein the secondary log managers keep track of the number of suppressed log messages and send the number of suppressed log messages to the primary log manager.

* * * * *